Dec. 14, 1926. 1,610,286
H. M. HOOD ET AL
ARTICLE COMBINING SPONGE RUBBER AND FIBROUS MATERIAL AND
METHOD OF PRODUCING THE SAME
Filed August 12, 1924
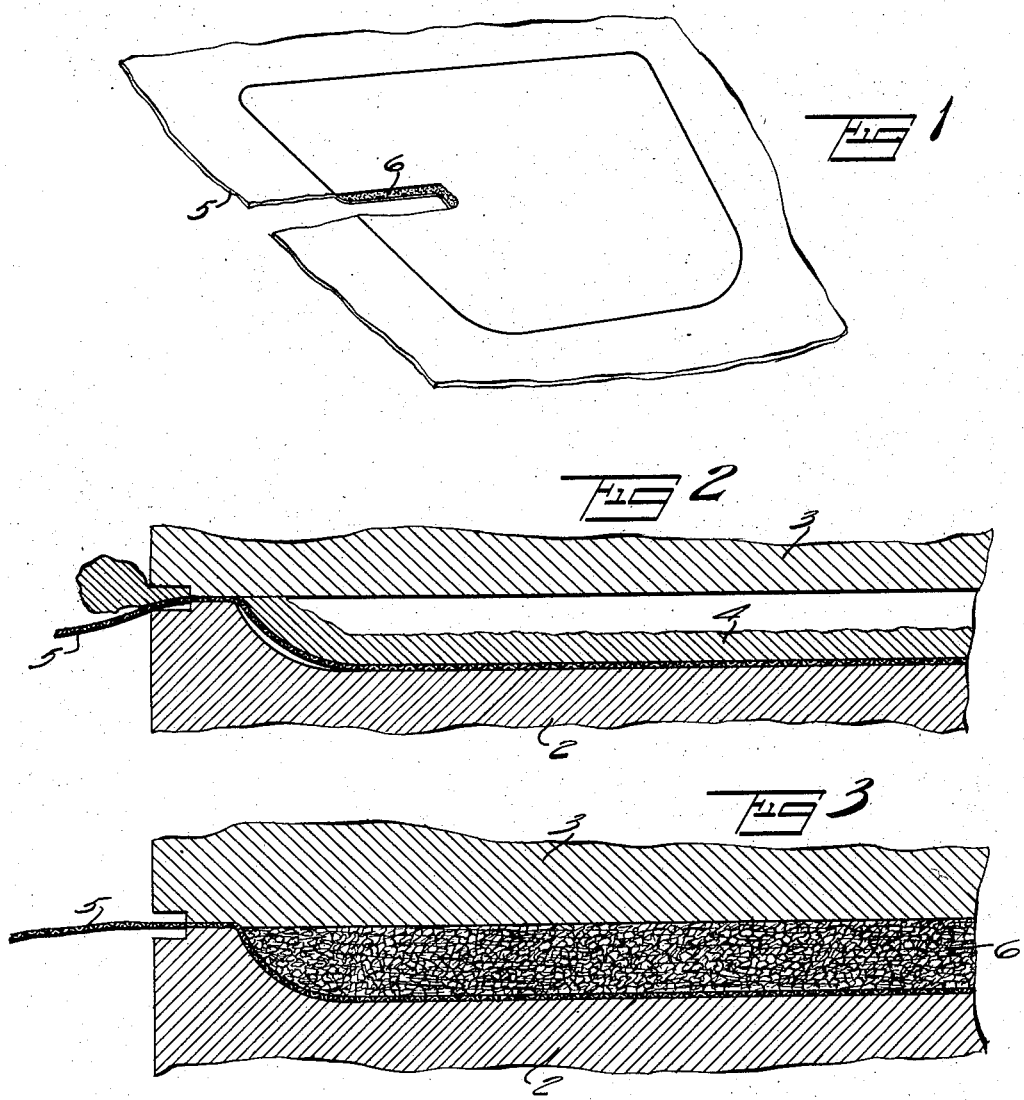
Harry M. Hood
Frank V. Wedlock
INVENTORS
BY
Cruse Thann
ATTORNEYS Patented Dec. 14, 1926.

1,610,286

UNITED STATES PATENT OFFICE.

HARRY M. HOOD AND FRANK V. WEDLOCK, OF CHICAGO, ILLINOIS, ASSIGNORS TO FEATHEREDGE RUBBER COMPANY, INC., A CORPORATION OF ILLINOIS.

ARTICLES COMBINING SPONGE RUBBER AND FIBROUS MATERIAL AND METHOD OF PRODUCING THE SAME.

Application filed August 12, 1924. Serial No. 731,640.

Our invention relates to a method of forming articles having a curved surface and which are made up, at least in part, of sponge rubber to which is united a surface layer of flexible fibrous material such as cloth, felt, leather or the like. This invention is based on the discovery that the swelling action and the pressure exerted by the sponge rubber during the process of vulcanization can be used to stretch the fibrous covering material to the desired curved or irregular shape. The heat used to cause the vulcanization may also to some extent assist to permit the fibrous material to stretch.

In carrying out our invention, sponge rubber compound is prepared in the manner understood by those skilled in the art, and shaped so that it may readily be placed in the desired mold. If the surface of the rubber has been coated with soapstone or the like it may be wiped with kerosene or other substance ordinarily used for cleaning the surface of rubber compounds and the fibrous material is spread over the rubber and pressed into place as smoothly as can be done. The compound with the covering material is then placed in the mold, which preferably is so constructed that the edges of the covering material will be held in place by the mold members. The mold is then placed in the usual steam vulcanizer press and subjected to the appropriate heat to effect the desired cure. This heat causes the rubber compound to swell with considerable pressure so that the fibrous material is stretched, preferably to conform with the shape of the mold. The material is, of course, held in this position until the rubber is fully cured, so that when the mold is opened the finished article will be found to be formed to the desired shape, with the cover fully stretched and held in place by the close bond which the rubber has made with it during the course of vulcanization.

By this process many useful articles may be made, such, for example, as chair cushions, which may be shaped so that the edges are beveled or curved and covered by the surface material.

A manner of carrying out our invention, as applied to a chair cushion which is taken as an illustrative example, is shown in the accompanying drawings, in which Fig. 1 shows a finished article, except that the edges are untrimmed, a piece of the article being broken away to show the construction; Fig. 2 is a section through the mold showing the relation of the parts prior to the vulcanizing operation, and Fig. 3 is a view similar to Fig. 2 showing the condition of the parts after the vulcanizing operation.

In carrying out the manufacture of a chair cushion, a sheet of stock properly compounded so that sponge rubber will result after curing, is laid on a flat table and the surface wiped with kerosene or other material adapted to clean the surface of the rubber. A piece of covering material such as felt, leather or the like is laid on the sheet of stock and pressed smoothly in place.

The mold has a lower part 2 formed with a concavity in its upper surface and a flat upper part 3. The rubber stock with the covering of felt or the like is then laid in the concavity and allowed to assume a natural position, the edges of the stock projecting over the edges of the mold. The cover 3 is then put in place and forced down against the lower portion 2. This will squeeze out the rubber that lies between the members 2 and 3, a portion being squeezed back into the mold cavity and the rest being squeezed out at the edges. In Fig. 2 the sheet of rubber stock is designated by the numeral 4 and the covering is designated by the numeral 5. The excess rubber squeezed from the mold may be removed and reused. The mold is then heated by any appropriate means to the proper temperature to effect the desired cure and the heat is maintained the proper length of time. This temperature and time will depend upon the nature of the compound used, as is well understood by those skilled in the art of making sponge rubber.

As shown in Fig. 2 the stock and cover do not fill the mold cavity between the members 2 and 3, but as the stock is vulcanized it swells largely and entirely fills the mold cavity. At the same time sufficient pressure is exerted by the swelling rubber to stretch the cover until it conforms to the shape of the mold cavity in member 2. This stretching may in part be assisted by the heat of the mold. In Fig. 3 the cover 5 is shown stretched in place and the balance of the mold is shown as filled with sponge rubber designated by the numeral 6.

In Fig. 1 the product is shown as it comes out of the mold. This comprises a body portion 6 of sponge rubber with a cover 5 firmly attached to it. A covering 5 may be used for attaching the cushion to an article, or the edges may be trimmed off and used as a portable cushion. In either event it is to be noted that the cover is stretched in place and follows smoothly the beveled edges of the rubber cushion.

It will be apparent that many other types of articles may be made by a like process and that the details may be modified in many particulars without departing from the spirit of our invention.

What we claim is:

1. The method of forming bodies of rubber having a non-plane surface covered with fibrous material, which comprises the steps of putting a sheet of fibrous material and a rubber compound adapted to swell when heated in a mold in such a way that the fibrous material must be stretched in order to conform to the shape of the desired article, and heating the mold while holding the edges of the sheet of fibrous material, whereby the rubber compound is caused to swell and thereby stretch the fibrous material to the desired form and at the same time the rubber is caused to adhere to the fibrous material.

2. A cushion comprising a sheet of sponge rubber having beveled edge portions and having one surface, including such edge portions, covered smoothly with fibrous material which is stretched to conform to such surface and which is united thereto by vulcanization and having the other surface uncovered.

HARRY M. HOOD.
FRANK V. WEDLOCK.